May 17, 1949. T. H. THOMAS ET AL 2,470,748
BOOSTER UNIT FOR HYDRAULIC PRESSURE SYSTEMS
Filed Oct. 4, 1943
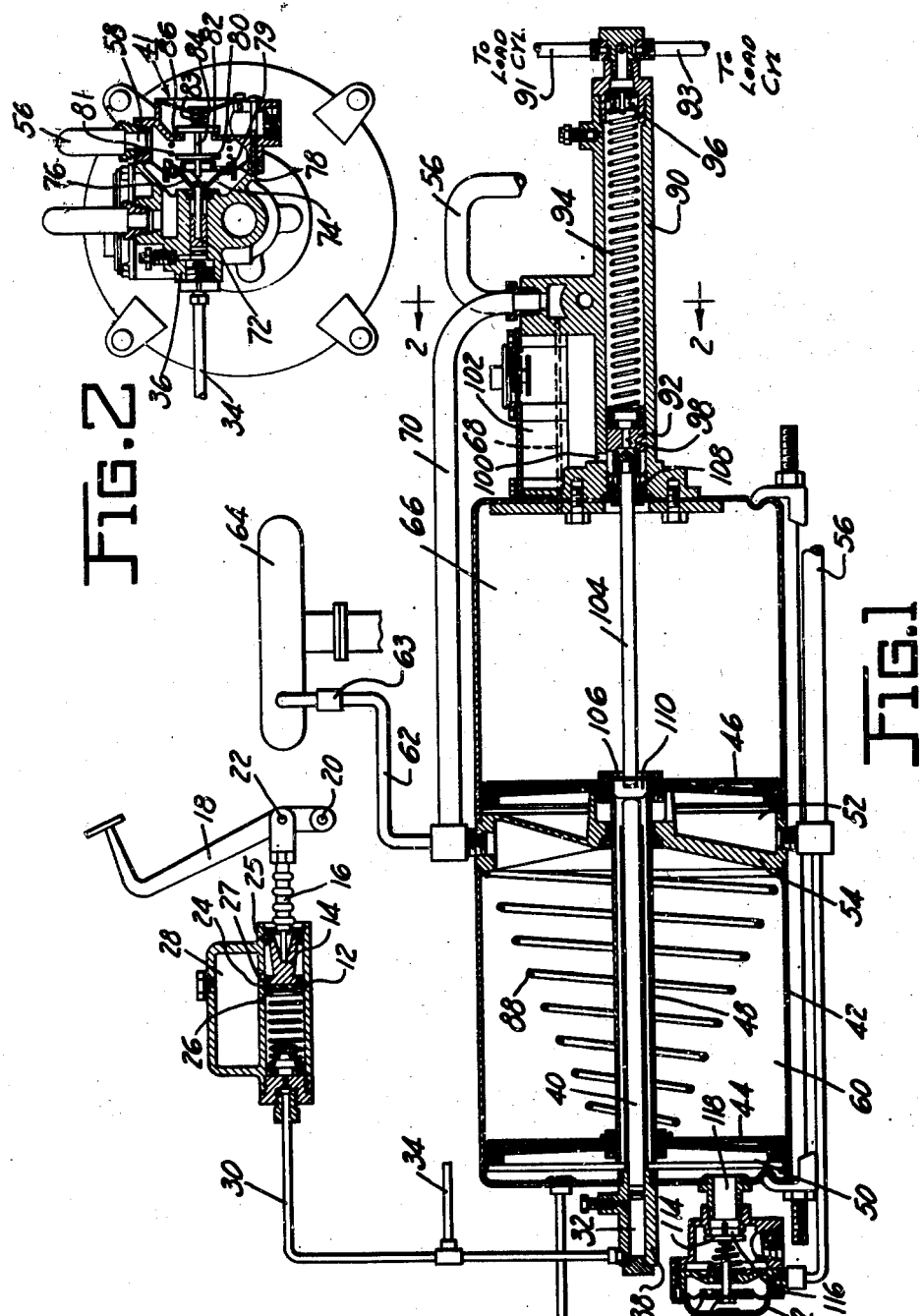
INVENTORS
EARL R. PRICE
THOMAS H. THOMAS
BY T.J. Plante
ATTORNEY Patented May 17, 1949

2,470,748

UNITED STATES PATENT OFFICE 2,470,748

BOOSTER UNIT FOR HYDRAULIC PRESSURE SYSTEMS

Thomas H. Thomas and Earl R. Price, South Bend, Ind., assignors to Bendix Aviation Corporation, South Bend, Ind., a corporation of Delaware Application October 4, 1943, Serial No. 504,854

4 Claims. (Cl. 60—54.5)

This invention relates to a booster unit for a hydraulic pressure transmitting system, which may be used for operating brakes or the like.

Patent application Serial No. 740,736, filed by Earl R. Price and Thomas H. Thomas, constitutes a division of this application.

In patent application Serial No. 368,560, filed by Earl R. Price, and issued on July 18, 1944, as Patent No. 2,353,755, a hydraulic brake applying system is disclosed, wherein two master cylinders are provided, one manually operated, and the other power operated. The pressure created in the manually operated master cylinder cooperates with the power booster in creating pressure in the power operated master cylinder and additionally actuates a valve which controls the power booster. In brake applying systems of this type, the power booster, the power operated master cylinder, and the control valve for the power booster may be positioned wherever convenient on the vehicle to be braked since only fluid connections are required between these parts of the system and the remaining parts of the system. The brake applying system shown in said application has both "follow-up" and "feel." This means, first, that the pedal or the like which controls the manually operated master cylinder must be moved progressively farther to increase the force of brake application, and, second, that a pressure proportional to that developed by the booster reacts against the pedal to apprise the operator of the extent of brake application.

In brake applying systems of the kind just described, it has heretofore been necessary to provide a manually operated master cylinder of sufficient liquid capacity or displacement to fully apply the brakes in case of power failure. In other words, the manually operated master cylinder had to be approximately as large as the power operated cylinder which was directly connected to the wheel or load cylinders or motors at the several brakes. The use of a large manually operated master cylinder has certain disadvantages, or, stating it another way, the use of a small or miniature manually operated master cylinder has several important advantages.

The primary object of the present invention is to provide, for a hydraulic system of the general type under discussion, a low displacement manually operated master cylinder, appreciably smaller than the manually operated master cylinders heretofore required.

A corollary object of the present invention is to combine a relatively low displacement manually operated master cylinder with a relatively high displacement master cylinder which is directly connected to the load cylinders and which is operated by power and manual means acting in cooperation.

A more specific object of the present invention is to provide a manually operated master cylinder for a system of the type referred to which, by virtue of its relatively small size, may be mounted with ease and simplicity in the vehicle to be braked and connected to a pedal or treadle actuating member with a minimum of complications. The low displacement of the manually operated master cylinder permits locating it in a minimum of space and requires only a short travel of the manually operable pedal or treadle, which means that a minimum of leg room is required for the operator.

Another specific object of the invention is to reduce the initial pressure losses due to friction and other causes in a hydraulic system of the type referred to. This reduction of initial pressure losses results from the substitution of a smaller manually operated master cylinder. In a master cylinder, friction of the sealing cup and the load of the return spring constitute a substantial force which must be overcome when the master cylinder is actuated. These initial pressure losses are much higher in a large master cylinder than in a small master cylinder.

A further specific object of the present invention is to provide a manual and booster operated hydraulic system which may be controlled by the operator with the maximum of efficiency. To this end it is desirable that the initial pedal pressure on the part of the driver required to operate the brakes be relatively low. On the other hand, it is desirable to have a relatively high pressure per square inch in the liquid in the master cylinder for operation of the valve which actuates or controls the power booster. If a high displacement manually operated master cylinder is used, the ratio of pressure in the master cylinder to pressure applied manually at the pedal must of necessity be relatively low, whereas, if a low displacement manually operated master cylinder is used, the ratio of pressure in the master cylinder to manual pressure on the pedal may be relatively high. This is true because the total pedal travel available is limited, and the ratio of pressure in the master cylinder to manual pressure must be so planned as to permit a full stroke of the master cylinder piston before the pedal travel has run out.

A further object of the present invention is to provide a manual and power operated hydraulic system of such a nature as to permit the manufacturer of a series of vehicles to use substantially the same size manually operated master cylinder in all of such vehicles, and to vary the total brake output by varying the size of the power operated master cylinder and the booster. This permits the manually operated master cylinder and even the vehicle itself to be so designed that said manually operated master cylinder will fit satisfactorily into the space provided and will be easily lined up with the pedal or treadle.

Other objects and advantageous features of our invention will become apparent during the course of the following description, reference being had therein to the accompanying drawings, in which:

Figure 1 is a part diagrammatic, part sectional view of a manual and booster operated hydraulic system incorporating our invention; and Figure 2 is a sectional view taken on the line 2—2 of Figure 1.

In order to obtain the objects and advantages of our invention, we have provided a manual and booster operated hydraulic system comprising, essentially, two individual parts, one of which has a relatively low displacement and the other of which has a relatively high displacement. Another way of stating the same general thought is to say that the hydraulic means which is controlled at one end by the operator and which at the other end applies pressure to a load cylinder constitutes, in effect, two separate hydraulic systems, which have different volume-displacements. The high displacement hydraulic system includes the power operated master cylinder and the load cylinder or cylinders. The low displacement hydraulic system includes the manually operated master cylinder, the motor which actuates the booster controlling valve, and a follow-up or variable volume chamber or motor which increases in volume as the booster operated master cylinder piston moves, and which adds manual pressure to the booster created pressure acting on said booster operated master cylinder piston. We thus make it possible to obtain a greater fluid volume output from the booster operated master cylinder than has heretofore been possible, presupposing a given size manually operated master cylinder.

Referring to Figure 1, a small, low displacement master cylinder or compressor 12 is provided with a piston 14 reciprocable therein which is mechanically connected by means of a rod 16 to a manually operable member such as a pedal 18 pivoted on a fixed part of the vehicle at 20, and pivotally connected to the rod 16 at 22. The piston 4 is provided with the conventional sealing cups 24 and 25 to prevent escape of liquid from the master cylinder, and the master cylinder bore is connected by means of the conventional compensating or recuperation port 26 and supply port 27 with liquid reservoir 28. The bore of the master cylinder 12 is connected by means of a conduit 30 with a low displacement follow-up chamber 32, while a branch conduit 34 connects conduit 30 with a hydraulic motor 36 (see Fig. 2) which operates a booster control valve. The follow-up chamber 32, which is variously called, in the specification and claims, an expansible chamber, a variable volume chamber, and a motor, is defined by a tube 38 and a small diameter piston 40 reciprocable in the tube.

The hydraulic master cylinder 12 and motors 32 and 36, together with the connecting conduits, constitute an individual hydraulic system. This hydraulic system has a relatively low liquid volume displacement, i. e., a relatively small amount of liquid is displaced during a stroke of the piston 14. Losses of liquid in the system are compensated for, and development of vacuum in the system on the piston return stroke is prevented, by means of the ports connecting the master cylinder 12 to the reservoir 28.

The liquid pressure in motor 36 operates a valve, indicated generally at 41, which in turn controls a power booster. The booster, which may be of any desired type, will vary in size according to the maximum hydraulic pressure and fluid displacement required to operate the brakes. In the present instance we have chosen to illustrate the booster as being a differential air pressure power cylinder 42. The term "power cylinder" is intended to include all boosters having a pressure responsive movable wall therein, whether of the diaphragm type, or of the piston type. Furthermore, the term "differential air pressure" booster is intended to include both those units in which compressed air operates against air at atmospheric pressure and those units in which air at atmospheric pressure acts against partial or complete vacuum, as well as all other variations in the use of air as a pressure transmitting medium. Where the term "piston" is used in the claims, it is intended to include any pressure responsive movable wall, whether of the solid type or of the flexible diaphragm type.

The power cylinder 42 may be provided, as shown, with two pistons or movable wall elements 44 and 46 in tandem, giving a large amount of power for the diameter of the power cylinder. The pistons 44 and 46 are connected together by a hollow rod 48, which also serves to connect chambers 50 and 52. A fixed wall 54 divides the power cylinder into two portions, each of which is, in effect, itself a power cylinder. Chamber 52 and, through it and rod 48, chamber 50 are connected by means of a pipe 56 with a port 58 in the valve 41. Chamber 60 of the power cylinder is connected by means of a pipe 62 and possibly check valve 63 with a suitable source of vacuum, such as the conventional intake manifold 64. Chamber 66 of the power cylinder is connected by means of a passage 68 and pipe 70 with the pipe 62 leading to the intake manifold.

The pressure in chambers 50 and 52 of the power cylinder is determined by the operation of the valve 41. A small piston 72, which is reciprocable in motor 36 is connected by means of a cage 74, having openings 76, with a diaphragm 78. An annular member 79 connected to the diaphragm 78 provides a seat for a poppet 80, and a second poppet 82, connected to the first poppet by means of a link 84, is adapted to seat at 86 on an extension of the valve casing. With the valve parts in the position shown, pipe 70, which is connected to manifold vacuum, is in communication with pipe 56, which is connected to chambers 50 and 52 of the power cylinder. Since chambers 60 and 66 of the power cylinder are at all times connected to manifold vacuum, the power cylinder is normally suspended in vacuum and is maintained in the position shown by the return spring 88 until the valve 41 is actuated to change the pressure in chambers 50 and 52 of the power cylinder. The valve 41 is biased to released position by means of a spring 81, compressed between the casing and diaphragm 78. In addition, a small spring 83 may aid in maintaining the poppets in proper position.

The high displacement hydraulic system which actuates the load cylinder or cylinders, also called wheel cylinders or motors, comprises a large, high displacement master cylinder or compressor 90, which is connected by means of conduits 91 and 93 with the load cylinders which apply the brakes, or accomplish other desired functions. The master cylinder 90 is appreciably larger in displacement than the master cylinder 12. This difference in volume may result from a difference in diameters of the master cylinder bores or from a difference in the length of stroke. In the particular embodiment of our invention illustrated in Figure 1, the difference in displacement of master cylinders 90 and 12 is due to the greater length and therefore greater stroke of master cylinder 90. By way of example merely, I shall cite the dimensions of a physical embodiment of our invention from which Figures 1 and 2 have been taken by reducing to a scale one-fourth of full size. The master cylinder 12 is illustrated as having a bore of approximately 1¼ inch diameter and a stroke of approximately 1½ inches. On the other hand, the master cylinder 90 is illustrated as having a bore of approximately 1⅛ inch diameter and a stroke of approximately eight inches. It will be readily appreciated that it has not, heretofore been possible to utilize, in a system of the type disclosed, master cylinders having displacements differing to the extent possible with our invention.

The master cylinder 90 has a piston 92 reciprocable therein, normally retained in released position by a return spring 94. The forward end of the bore of master cylinder 90 is preferably provided with a residual pressure check valve 96 which maintains a slight pressure in the load cylinders even when the brakes are released. Compensation for losses in liquid in the large displacement hydraulic system is accomplished through a passage 98 in the piston 92, and a compensation or recuperation port 100, which connects the large displacement master cylinder to a liquid reservoir 102, mounted directly above the large displacement master cylinder.

A thrust rod 104, which is connected to the hollow rod 48 and to the power cylinder pistons by means of a thrust cap 110 and cross-bar 106, or other suitable connections, is arranged to transmit force from the power cylinder pistons to the piston 92, moving it forward in the base of master cylinder 90, a valve 108 being carried by the front end of the rod for the purpose of closing the compensating passage 98 when the piston 92 begins its compression stroke.

The tube 38 extends an appreciable distance into the power cylinder, inside the hollow rod 48, and the small diameter piston 40 is sufficiently long to contact a thrust member 110, which is connected to rod 48 by the cross-bar 106. The thrust member 110 thus transmits pressure from piston 40 to rod 104 and piston 92, the pressure of hydraulic liquid in chamber 32 cooperating with the power cylinder in applying pressure to the piston 92. Although the piston 92 is adapted to be moved by either or both manually and power created pressure, the designation "power operated master cylinder," where used in the specification and claims, is intended to refer to the large displacement master cylinder 90.

Operation of the entire pressure creating and transmitting system is as follows. By depressing the pedal 18 (the term "pedal" is intended to include broadly any manually operable member), the operator creates a pressure in master cylinder 12. This pressure is transmitted both to chamber 32, where it exerts a pressure on piston 40 tending to create pressure in master cylinder 90, and to motor 36 where it exerts a pressure on piston 72, moving the piston and with it the diaphragm and valve seat 79 against the resistance of spring 81. The poppet 80 seats at 79, cutting off communication between pipe 56 and the vacuum pipe 70. Further movement of piston 72 and diaphragm 78 forces poppet 82 off its seat, admitting air at atmospheric pressure from port 85 into the chamber between the two poppets and thence into pipe 56. Air flowing through pipe 56 into chambers 50 and 52 of the power cylinder creates a pressure differential over the power cylinder pistons, urging them in a direction to push piston 92 in a pressure creating direction. Thus piston 92 is subjected to the combined pressures of the power cylinder and the liquid in chamber 32. Moving on its stroke, piston 92 displaces liquid under pressure to the load cylinders to apply the brakes.

Valve 41 is "reactionary" in the sense that it is arranged to oppose its continued actuation with a pressure proportional to the pressure developed by the power cylinder. After the poppet 80 is seated, the diaphragm 78 becomes a pressure responsive element subjected to differential pressures, one of which is the vacuum prevailing in pipe 70, and the other of which is the pressure prevailing in pipe 56, which corresponds substantially to the pressure acting on the pistons of the power cylinder. Thus, a pressure proportional to that developed by the power cylinder acts on the diaphragm 78, urging it toward piston 72, and thus creating a reaction pressure in the liquid in master cylinder 12, which pushes against the pedal, giving the operator a "feel" to indicate the extent of power application of the brakes.

As the power cylinder pistons move on the power applying stroke, the piston 40 is caused by the pressure in chamber 32 to follow up the power pistons, thus gradually increasing the volume of chamber 32, and permitting liquid from the master cylinder 12 or motor 36 to enter chamber 32. This tends to reduce the pressure in motor 36 and permit the valve 41 to return to lapped or released position, unless the operator "follows-up" by progressively depressing the pedal 18.

Although it forms no part of the present invention, we have illustrated at 112, a "fast application" valve. This valve comprises a poppet 114 which controls the admission of air through a port 116 and passage 118 to chamber 50, and a diaphragm 120 which is connected to the poppet 114 by means of a rod 122, and which is subjected on the rod side to the pressure prevailing in pipe 56 and on the opposite side to the pressure prevailing in chamber 50. Since pipe 56 is the control line from the valve 41, a tendency of the change of pressure in chamber 50 to lag excessively behind the change of pressure in the control valve 40 will cause the diaphragm 120 to lift poppet 114 from its seat, permitting air to rush directly into chamber 50 and thereby speed up application of the power cylinder.

The displacement of the manually operated master cylinder 12 must be equal to the sum of the displacements of the follow-up chamber 32 and the valve actuating motor 36. For this reason both piston 40 and piston 72 are very small in diameter. For instance, in the embodiment shown, the diameter of the piston 40 is approximately ½ inch (full size) and the diameter of piston 72 also is approximately ½ inch. The power operated master cylinder 90 must have a displacement adequate to match the required displacement of the load cylinder or cylinders.

Because of the low displacement of the manually operated hydraulic system, this system becomes, relatively speaking, a high pressure system. That is, assuming that a given displacement is necessary at the load cylinders, our invention permits the manually operated hydraulic system to be operated at a pressure much higher than has heretofore been possible. This is true because the low displacement of the manually operated hydraulic system permits a high ratio of pressure in the master cylinder 12 to pressure exerted by the operator on the pedal. On the other hand, the hydraulic system which includes the master cylinder 90 may be considered as a relatively low pressure system, in the sense that it operates at a lower pressure and higher displacement, assuming a given displacement manually operated master cylinder, than has heretofore been possible.

Use of a small, high pressure manually operated master cylinder has definite advantages. In addition to the advantages resulting from the smallness of the master cylinder, the high pressure at which it operates makes it possible to actuate the valve 41 at a low initial pedal pressure. The hydraulically operated valve 41 must be biased to released position, and therefore must have a return spring of the necessary strength. If a residual pressure is maintained in the low displacement hydraulic system, the strength of the return spring in the valve must be increased an additional amount. If, in order to make a relatively low initial pedal pressure operate the valve, the size of the valve piston 72 were increased, a larger diaphragm in the valve would be necessary to give the proper reaction; otherwise, the range of pedal pressures between initial brake application and full power application would be reduced, resulting in poor control of the brakes. By using a high pressure hydraulic control system, sufficient operating pressure is available in the valve motor 36, without need for a large piston.

In a normal brake application, the pressure per square inch developed in the manually operated master cylinder 12 may or may not be higher than the pressure developed by the power operated master cylinder 90. This is true because, even though the master cylinder 90 displaces a much larger quantity of fluid, the piston 92 is acted on by the pressures of both the power cylinder and the follow-up chamber 32. The entire unit, including both low displacement and high displacement hydraulic systems, together with the booster, is not necessarily a pressure multiplying unit, though it is a work multiplying unit. This means that, while the relative pressures per square inch in the large and small master cylinders may be varied according to design, the work accomplished at the load cylinder or cylinders is greater than that accomplished at the manually operated master cylinder 12, owing to the combination of power and manual work-accomplishing means.

It is important that the brake applying unit be operable to apply the brakes manually in case of power failure. In case of such failure of power, we have provided that the manually created pressure exerted on the piston 40 shall act through the rod 104 to exert a brake applying pressure on the piston 92, thus insuring manually operable brakes at all times.

Furthermore, it is important that, particularly in case of power failure, insurance be provided against forcing the liquid from the low displacement hydraulic system into the high displacement system, and thereby running out of pedal travel without displacing sufficient liquid to apply the brakes. To this end, we have connected the conduit 30 which leads from the small master cylinder 12 only to the follow-up chamber and valve operating motor. The conduit 30 does not connect to the large master cylinder 90 for the purpose of providing liquid compensation for said master cylinder 90, as was the case in Price application 368,560, referred to above. Instead, the chamber at the rear of piston 92 is connected to a separate reservoir 102. This arrangement insures against loss of pedal reserve due to failure of the power cylinder to operate, inasmuch as the movement of piston 40 to apply the brakes manually requires no greater displacement of liquid than is required when the power cylinder operates. When the brakes are applied by manually created pressure alone, the pressure at the load cylinders is as great as if a large manually operated master cylinder were used, and were allowed to communicate directly with the load cylinders, in case of power failure. This is due to the higher pedal ratio made possible by using the small manually operated power cylinder.

In order to explain rather fully the principles underlying our invention, we shall take a specific example, giving assumed sizes and volumes to the parts of the system, and indicate the pressures and displacements involved in operation of brakes or the like by a hook-up incorporating the principles of our invention. It must be understood that this example is only for the purpose of simplification of the underlying ideas, and that the variations possible without departing from the scope of our invention are infinite in number. Assuming that we have a system composed of the following units: (1) a piston type power cylinder using vacuum as a source of power, (2) a low displacement manually operated master control cylinder having a ½ inch diameter piston actuated by a treadle having a ratio of 4:1, (3) a low displacement follow-up cylinder having a ½ inch diameter, (4) a control valve which requires 1500 pounds per square inch hydraulic control pressure to produce a change in vacuum corresponding to 20 inches of mercury, and (5) a power operated master cylinder having a one-inch diameter piston. Let us further assume that we wish to know the required treadle pressure and the hydraulic pressure at the load cylinders when there is a vacuum difference of 20 inches of mercury across the power cylinder piston. Starting at the power cylinder, assume further that the cylinder is capable of producing a force of 800 pounds with 20 inches of mercury pressure difference across the piston. This force when acting upon the one-inch diameter piston of the power operated master cylinder would produce 1,002 pounds per square inch hydraulic pressure, as follows:

$$1'' \text{ diameter} = .785 \text{ sq. in. area}$$

$$\frac{800}{.785} = 1002 \text{ p. s. i.}$$

To produce 20 inches of vacuum will require 1500 pounds per square inch at the hydraulically operated control valve. This pressure is produced at the manually operated master control cylinder and is acting against the follow-up cylinder piston. We have assumed a one-half inch diameter for the follow-up cylinder. Therefore, this cylinder adds 294 pounds to the force developed by the power cylinder, which in turn means the addition of 374 pounds per square inch hydraulic pressure at the load cylinders.

$$\tfrac{1}{2}'' \text{ dia.} = .196 \text{ sq. in. area}$$
$$1500 \times .196 = 294 \text{ pounds}$$
$$\tfrac{294}{.785} \text{ lb.} = 374 \text{ p. s. i.}$$

Therefore, the total output is equal to the sum of the forces of the power cylinder and the follow-up cylinder acting on the one inch diameter power operated master cylinder piston, which is 1376 pounds per square inch hydraulic pressure. (1002+374=1376). To produce 1376 p. s. i. hydraulic pressure at the load cylinders required 1500 p s. i. hydraulic pressure in the valve control hydraulic cylinder. To create this amount of pressure requires a force of 294 lb. acting against the low volume, high pressure master control cylinder piston. This force is produced by a force on the treadle equal to one fourth of 294 lb. because we have assumed a treadle ratio of 4:1.

$$1500 \times .196 = 294$$
$$\tfrac{294}{4} = 73.5 \text{ lb.}$$

Therefore, in summing up the above information, we have a force of 73.5 lb. on the treadle producing 1500 p. s. i. hydraulic pressure at the valve and at the follow-up cylinder. This pressure of 1500 p. s. i. actuates the power cylinder control valve and adds a force to the force created by the power cylinder. These two forces act on the high displacement master cylinder to produce a total output hydraulic pressure of 1376 p. s. i. at the load cylinders. Furthermore, the ratio of displacement in the high displacement system to displacement in the low displacement system is approximately equal to the ratio of the area of the large master cylinder piston to the area of the follow-up cylinder piston, or $$\tfrac{.785}{.196}$$

We say the ratio is "approximately" equal because we have neglected to take into account the displacement of the hydraulically controlled valve, which is almost negligible.

Although certain specific embodiments of our invention have been described for the purpose of fully illustrating the principles underlying our invention, there are innumerable other embodiments which will properly come within the scope of our invention. Accordingly, it is our intention that the terms of the following claims constitute the only limitation upon the scope of our invention.

We claim:

1. For use in a hydraulic pressure system, a booster unit comprising a power cylinder casing, a partition dividing said casing into two sections except for an opening through the center thereof, two power pistons arranged in tandem each in one of the sections of the power cylinder, a tubular member extending through the opening in the partition to interconnect the two power pistons and combine them into a unitary power element, a hydraulic master cylinder supported on the front end of the power cylinder and coaxial with said power cylinder, said master cylinder having an outlet port adapted to be connected to a hydraulically operated motor, a piston reciprocable in the master cylinder, a reservoir associated with the master cylinder and also supported on the front end of the power cylinder casing, a rod connected to the unitary power element adjacent the forward power piston and extending into the master cylinder to transmit force from the unitary power element to the master cylinder piston, a hydraulic follow-up cylinder supported on the rear end of the power cylinder casing and including an elongated sleeve extending into the interior of the aforementioned tubular member for substantially the entire length of said tubular member, the outer diameter of said sleeve being appreciably smaller than the inner diameter of the tubular member, said hydraulic follow-up cylinder being coaxial with the power cylinder and master cylinder and having an inlet port adapted to be connected to an operator operated master cylinder, a piston in said hydraulic follow-up cylinder extending through said sleeve and acting against the forward portion of the unitary power element to add its force to that developed by and power cylinder pistons, said follow-up piston having a cross-sectional area appreciably less than the cross-sectional area of the piston in the power operated master cylinder, a valve casing supported on the power cylinder casing, valve means in said valve casing adapted to control operation of the power cylinder pistons, and a hydraulically operated piston controlling said valve means and acted on by the pressure developed in the operator operated master cylinder.

2. For use in a hydraulic pressure system, a booster unit comprising a power cylinder casing, a partition dividing said casing into two sections except for an opening through the center thereof, two power pistons arranged in tandem each in one of the sections of the power cylinder, a tubular member extending through the opening in the partition to interconnect the two power pistons and combine them into a unitary power element, a hydraulic master cylinder supported on the front end of the power cylinder and coaxial with said power cylinder, said master cylinder having an outlet port adapted to be connected to a hydraulically operated motor, a piston reciprocable in the master cylinder, a reservoir associated with the master cylinder, a rod connected to the unitary power element and extending into the master cylinder to transmit force from the unitary power element to the master cylinder piston, a hydraulic follow-up cylinder supported on the rear end of the power cylinder casing and including a sleeve extending into the interior of the aforementioned tubular member, said hydraulic follow-up cylinder being coaxial with the power cylinder and master cylinder, and having an inlet port adapted to be connected to an operator operated master cylinder, a piston in said hydraulic follow-up cylinder extending through said sleeve and acting against the unitary power element to add its force to that developed by the power cylinder pistons, said follow-up piston having a cross-sectional area appreciably less than the cross-sectional area of the piston in the power operated master cylinder, and hydraulically operated valve means acted on by the pressure developed in the operator operated master cylinder and arranged to control operation of the power cylinder pistons.

3. For use in a hydraulic pressure system, a booster unit comprising a power cylinder casing, a partition dividing said casing into two sections except for an opening through the center thereof, two power pistons arranged in tandem each in one of the sections of the power cylinder, a tubular member extending through the opening in the partition to interconnect the two power pistons and combine them into a unitary power element, a hydraulic master cylinder having an outlet port adapted to be connected to a hydraulically operated motor, a piston reciprocable in the master cylinder, a reservoir associated with the master cylinder, force transmitting means arranged to transmit force from the unitary power element to the master cylinder piston, a hydraulic follow-up cylinder supported on the rear end of the power cylinder casing and including a sleeve extending into the interior of the aforementioned tubular member, said hydraulic follow-up piston being coaxial with the power cylinder and master cylinder and having an inlet port adapted to be connected to an operator operated master cylinder, a piston in said hydraulic follow-up cylinder extending through said sleeve and acting against the unitary power element to add its force to that developed by the power cylinder pistons, said follow-up piston having a cross-sectional area appreciably less than the cross-sectional area of the piston in the power operated master cylinder, and hydraulically operated valve means acted on by the pressure developed in the operator operated master cylinder and arranged to control operation of the power cylinder pistons.

4. For use in a hydraulic pressure system, a booster unit comprising a power cylinder casing, a partition dividing said casing into two sections except for an opening through the center thereof, two power pistons arranged in tandem each in one of the sections of the power cylinder, a tubular member extending through the opening in the partition to interconnect the two power pistons and combine them into a unitary power element, a hydraulic master cylinder having an outlet port adapted to be connected to a hydraulically operated motor, a piston reciprocable in the master cylinder, force transmitting means arranged to transmit force from the unitary power element to the master cylinder piston, a hydraulic follow-up cylinder located at the rear end of the power cylinder casing and including a sleeve extending into the interior of the aforementioned tubular member, said hydraulic follow-up piston having an inlet port adapted to be connected to an operator operated master cylinder, a piston in said hydraulic follow-up cylinder extending through said sleeve and acting against the unitary power element to add its force to that developed by the power cylinder pistons, said follow-up piston having a cross-sectional area appreciably less than the cross-sectional area of the piston in the power operated master cylinder, and hydraulically operated valve means acted on by the pressure developed in the operator operated master cylinder and arranged to control operation of the power cylinder pistons.

THOMAS H. THOMAS.
EARL R. PRICE.

REFERENCES CITED

The following references are of record in the file of this patent:

UNITED STATES PATENTS

| Number | Name | Date |
|---|---|---|
| 2,218,191 | Dick | Oct. 15, 1940 |
| 2,252,482 | Gates | Aug. 12, 1941 |
| 2,260,490 | Stelzer | Oct. 28, 1941 |
| 2,275,697 | Stelzer | Mar. 10, 1942 |
| 2,328,637 | Freeman | Sept. 7, 1943 |
| 2,352,357 | Almond | June 27, 1944 |
| 2,353,755 | Price | July 18, 1944 |
| 2,365,471 | Ingres | Dec. 19, 1944 |
| 2,372,014 | Rockwell | Mar. 20, 1945 |

Certificate of Correction

Patent No. 2,470,748                                              May 17, 1949

THOMAS H. THOMAS ET AL.

It is hereby certified that errors appear in the printed specification of the above numbered patent requiring correction as follows:

Column 5, line 47, for the word "cap" read *cup*; column 10, line 25, for "and" before "power" read *the*; column 10, line 60, after "cylinder", second occurrence, strike out the comma;

and that the said Letters Patent should be read with these corrections therein that the same may conform to the record of the case in the Patent Office.

Signed and sealed this 9th day of May, A. D. 1950.

[SEAL]

THOMAS F. MURPHY,
*Assistant Commissioner of Patents.*